United States Patent [19]

Wilke et al.

[11] 4,334,884

[45] Jun. 15, 1982

[54] PROCESS FOR THE CONTINUOUS PREPARATION OF PHOTOGRAPHIC EMULSIONS

[75] Inventors: Werner Wilke, Starnberg; Hans Gref, Cologne; Hans Frenken, Odenthal-Osenau, all of Fed. Rep. of Germany

[73] Assignee: AGFA-Gevaert AG, Leverkusen, Fed. Rep. of Germany

[21] Appl. No.: 178,145

[22] Filed: Aug. 14, 1980

Related U.S. Application Data

[63] Continuation of Ser. No. 967,778, Dec. 8, 1978, Pat. No. 4,241,023.

[30] Foreign Application Priority Data

Dec. 10, 1977 [DE] Fed. Rep. of Germany ....... 2755166

[51] Int. Cl.$^3$ ................ B01J 13/00

[52] U.S. Cl. ................ 23/293 R; 137/2; 137/4; 252/314; 366/176; 423/46

[58] Field of Search ................ 422/187-189, 422/196, 197, 209, 224; 23/293 R; 366/162, 176, 339; 252/314, 359 R, 359 A; 430/564; 423/46; 137/2, 4, 92, 93, 567, 571

[56] References Cited

U.S. PATENT DOCUMENTS

| | | | |
|---|---|---|---|
| 1,905,467 | 4/1933 | Hickman | 137/4 X |
| 1,985,312 | 12/1934 | Bryson | 137/4 |
| 2,621,672 | 12/1952 | Jacobs | 137/92 |
| 2,712,752 | 7/1955 | Hage | 137/92 X |
| 2,978,951 | 4/1961 | Christie | 137/2 X |
| 3,268,299 | 8/1966 | Russell | 422/197 X |
| 3,475,392 | 10/1969 | McCoy et al. | 137/93 X |
| 3,532,102 | 10/1970 | Glassey | 137/93 X |
| 3,655,166 | 4/1972 | Sauer et al. | 366/162 |
| 3,728,280 | 4/1973 | Sauer et al. | 252/314 |
| 3,779,518 | 12/1973 | Koepke et al. | 137/567 X |
| 3,827,888 | 8/1974 | Terwilliger et al. | 366/339 X |
| 3,888,465 | 6/1975 | Terwilliger et al. | 366/339 |
| 3,897,935 | 8/1975 | Forster et al. | 366/339 |

FOREIGN PATENT DOCUMENTS

| | | | |
|---|---|---|---|
| 1000686 | 1/1957 | Fed. Rep. of Germany . | |
| 1106168 | 12/1961 | Fed. Rep. of Germany . | |
| 1472745 | 2/1972 | Fed. Rep. of Germany . | |
| 846387 | 9/1939 | France | 366/162 |

*Primary Examiner*—Richard L. Chiesa
*Attorney, Agent, or Firm*—Connolly and Hutz

[57] ABSTRACT

The invention relates to a process for the continuous preparation of photographic emulsions by a continuous flow process, in which a volume stream entering a pipe system flows successively through the various sections of this system corresponding to the individual stages of the process, such as the inlet points for introduction of the volume streams, mixing paths and ripening paths.

3 Claims, 12 Drawing Figures

PROCESS FOR THE CONTINUOUS PREPARATION OF PHOTOGRAPHIC EMULSIONS

CROSS REFERENCE TO RELATED APPLICATIONS

This application is a continuation of copending application Ser. No. 967,778, filed Dec. 8, 1978 by the same inventors now U.S. Pat. No. 4,241,023.

This invention relates to a process for the preparation of photographic silver halide emulsions by a continuous process, in which a stream of liquid entering a conduit system flows successively through the various sections of the system corresponding to the individual stages of the process, such as the inlet point for the metered streams of liquid, the mixing paths and the ripening paths.

The continuous process can easily be developed from the known batchwise process. Instead of the individual stages of the process taking place one after the other in the same place as in the batchwise process, in this case they take place one at successive locations in a conduit system.

The stream of halide solution containing gelatin which is introduced at the inlet of the conduit system corresponds to the so-called reaction medium in the batchwise process. The inlet points for the addition of silver nitrate solution or other additives and the associated mixing paths and ripening paths are arranged to correspond to the time sequence of the various stages of the batchwise process taking place in a reaction vessel.

The number of streams of liquid added and their proportion to each other must correspond to the formulation for the preparation of the particular emulsion.

The length of the ripening paths must correspond to the ripening time of the given recipe. If there is any change in the recipe, the number of inlet points, the metering connections per inlet point, the quantities added and the length of the ripening paths must be adapted to the new recipe.

The continuous preparation of light-sensitive photographic silver halide gelatin emulsions is already known. In German Pat. No. 1 000 686 there is described a continuous preparation of light-sensitive photographic silver halide emulsions ready for casting by introduction of solutions of the individual components into a closed, lightfast tubular apparatus which is subdivided into several production zones, in which the individual stages of the process, such as precipitation of silver halide, physical ripening, washing, chemical after-ripening and finishing to make the emulsion ready for casting on the layer substrate, take place.

In the aforesaid process, gelatin solutions containing potassium bromide are continuously mixed with silver nitrate solution in a filling zone which is equipped with a stirrer apparatus. The following ripening zone is equipped with stirrer screws. The uniformity of dwell time of all the particles of emulsion in the ripening zone which should be achieved in a satisfactory batchwise process after vigorous mixing of the components is only incompletely of conveyor screws in each section of the ripening path would appear to be very complicated and expensive and unsuitable for rapid cleaning of the process when changing the reaction mixture.

In German Pat. No. 1 106 168 there is described a process for the continuous preparation of photographic emulsions in a tank process by means of a plurality of small batches, in which the tanks are successively moved at regular time intervals to the individual operating stations in order to carry out the essential processes for preparation of the emulsion. This is a continuous process only in its practical outcome but as regards the technique of the process it is a discontinuous, batchwise process with all the known disadvantages which this entails.

An improvement by using larger batches is disclosed in German Offenlegungsschrift No. 1 472 745 which describes a process for the preparation of light-sensitive silver salts which are sparingly soluble in water by the precipitation of water-soluble silver salts with water-soluble metal salts, in which process the dispersion is prepared in two stages.

Precipitation is carried out in a relatively small precipitation space, for example in a pump, by very vigorous mixing of the aqueous solutions of the precipitation components, and the resulting dispersion is then immediately transferred to a ripening chamber of considerably larger volume in which physical ripening is carried out.

Although this method of preparation is a considerable improvement compared with the usual batchwise tank process in providing larger quantities of uniform product, it still has the disadvantage of uneven mixing in the large tank, and the small units of emulsion are not all identical to each other, especially since the dwell times in the tank may vary considerably. Moreover, continuous production is not possible.

The U.S. Pat. No. 3,655,166 describes a continuous process for the preparation of emulsions in which the basic component is carried in an ascending stream inside a closed tubular apparatus and the other components are added successively at cyclically symmetrical points in a transverse direction of flow to the reaction mixture which is in the process of being formed from the main component.

This process provides important improvements with regard to the uniformity and continuity of production as well as the possibility of a large number of variations in the addition of components and the ripening time of the particular reaction mixture.

The process has, however, the disadvantage that the mixing space and the ripening space are not clearly separated from each other so that the flow in the ripening space is disturbed by the mixing flow and the particles of emulsion entering at any given point therefore do not have a uniform through-flow time or ripening time. Moreover, adjustment of the apparatus to another recipe with a different ripening time by dismantling and reassembly of part of the pipe elements is too complicated, particularly if the apparatus is very high because it is designed for long ripening times.

The U.S. Pat. No. 3,728,280 is a further development of the U.S. Pat. No. 3,655,166. It describes an improved method of mixing, in which vibrations in the axial direction of the tubular apparatus are superimposed on the radial transverse stream. In addition, the height of the apparatus is reduced by curving the pipes which are made partly of rigid, partly of elastic sections. However, the disadvantage of interference of the ripening stream by the mixing stream and hence lack of uniformity of the ripening time of the particles of emulsion remains.

The U.S. Pat. No. 3,779,518 describes a process for the continuous preparation of photographic emulsions in which the individual components are introduced into a tubular apparatus together with the crude emulsion and distributed within each other, the individual components being continuously added successively to the main stream, and whichever component has just been added is completely mixed with the main stream in the mixing zone immediately after its entry into the main stream. This mixing may take place in a static mixing path with secondary swirling flow or according to U.S. Pat. No. 3,827,888, FIGS. 2 and 3.

However, this process does not constitute complete preparation of an emulsion since it is only used for making a crude emulsion ready for casting and therefore has no provisions for ripening times or ripening paths.

In the preparation of emulsions, the required spectrum of particle sizes in the finished emulsion plays an important role. In many cases, a very narrow spectrum of particle sizes, i.e. uniformity of particle size is required. This means that all the particles of liquid must undergo the same changes in state with time after entering the process. The continuous flow process appears to be particularly suitable for achieving this if the following conditions are observed:

(a) Each mixing process must be carried out very intensively in view of the chemical reaction associated with it, and should be completed within the shortest possible time. This means that the volume of mixing chamber should be small.

(b) In the ripening paths, there must be a close approximation to a rectangular velocity profile because only in this way is it possible to ensure that all the liquid particles will have the same through-flow time. A velocity profile in the form of a Poiseuille's parabola would be unsuitable. The rectangular velocity profile must on no account be disturbed by remote action from the mixing paths, still less by the stirrer in the ripening path.

Requirements (a) and (b) indicate that the mixing and ripening zone must be clearly separated from each other.

Although homogeneous emulsions with a narrow particle size spectrum are sometimes required, in other cases emulsions are required to have a wide particle size spectrum, i.e. differing particle sizes. In practice, this means differing dwell times of the particles in the ripening paths. However, it must be possible to control these dwell times.

Other important practical requirements include simple and rapid adjustment of the apparatus, i.e. particularly adjustment of the length of the ripening paths to the recipe and ease of cleaning.

An object of the invention is to provide a process which ensures that mixing of added partial streams will be achieved within a short time and the ripening times prescribed by the formulation for the emulsion will be reliably observed, the process being readily adaptable to all production requirements and recipes of a continuously operating plant and being easy to clean.

According to the invention there is provided a process for the continuous preparation of photographic emulsions by a continuous flow process, in which a stream entering a pipe system flows successively through the various sections of this system corresponding to the individual stages of the process, wherein a path for mixing and ripening of the emulsion is provided which comprises multiple piston metering pumps with pump heads moving in unison, mixing paths and ripening pipe packets which are arranged in series downstream of these mixing paths but separately from them and are composed of a plurality of individual pipes, which pipe packets are replaceable as units and can be varied as to the number of pipes contained in them, the diameter of the ripening pipes being adjusted to the stroke number of the piston metering pump and the kinematic viscosity of the streams of emulsion so that delivery of the stream in the ripening pipes always occurs only in the initial state of the starting flow.

In a preferred embodiment the packets of ripening pipes are adapted to be displaced and tilted and may be replaced by others of a different pipe length or a different number of pipes or pipe diameter, depending on the dwell time requirements of the recipe.

According to the invention, the individual pipe packet composed of a plurality of pipes may be varied by connecting the individual pipes in series and/or in parallel.

According to one particular embodiment, the individual packets of ripening pipes are equipped with bypass ducts and restrictors so that the stream of liquid in the individual ripening paths is subdivided into partial streams with differing through-flow times.

It has also been found to be advantageous to provide manually operated or remote controlled multiway taps at the junctions of the bypass ducts for convenient variation of the pathways.

It is surprisingly found that this process according to the invention for the continuous preparation of emulsions in separate mixing and ripening chambers results in a substantial improvement in the quality of finished emulsions. This is attributable partly to the thorough and rapid mixing of the partial streams and partly to the accurate observance of the times of flow of the individual emulsion particles through the ripening paths dictated by the recipe. The latter is achieved by the fact that the stream in the ripening pipes, which is uninfluenced by the mixing zone, is a rectangular stream.

As a rough approximation, a rectangular flow profile is obtained even with a stationary turbulent flow but the dimensions necessary for this in practice are usually a diameter d of ripening path which is too small and a length L which is too great and difficult to handle. For example, the necessary conditions for a turbulent flow at an output of $0.125 \times 10^{-3}$/sec and a dwell time of 600 sec are $$d_1 < 0.053 \text{ m} \quad L_1 > 34.2 \text{ m}$$

for a kinematic viscosity of $\nu_1 = 1 \times 10^{-6}$ m$^2$/sec $$d_2 < 0.011 \text{ m} \quad L_2 > 855 \text{ m}$$

for a kinematic viscosity of $\nu_2 = 5 \times 10^{-6}$ m$^2$/sec

By contrast, the method according to the invention of delivering the stream of liquid by means of intermittently conveying piston metering pumps working in unison, in which the piston stroke number is adjusted to the diameter of the ripening path and the kinematic viscosity, results in a much closer approximation to a rectangular profile and much more suitable pipe dimensions.

The intermittent delivery enables the starting impulse of a pipe flow to be utilised. A pipe flow starting from rest has a rectangular velocity profile at the very beginning, and this profile gradually changes into a stationary laminar or turbulent profile due to friction against the wall. If the piston stroke time is so short that the starting flow is still in its initial stage and the deformation of the rectangular velocity profile is therefore still negligible, a rectangular pipe flow is obtained which is intermittent with the frequency of the metering piston pumps. The condition for this is as follows:

for in Reynolds Number $Re = \frac{8}{\pi}\frac{\dot{V}}{d} < 2320$(laminar flow) for the Reynolds Number $Re = \frac{8}{\pi}\frac{\dot{V}}{dv} > 2320$(turbulent flow)

$$\frac{1}{2n} = t_K < 1.15 \times 10^{-3}\frac{d^2}{\nu} \qquad \frac{1}{2n} = t_K < \frac{\pi}{8}\frac{d^3}{\dot{V}}$$

wherein the symbols have the following meanings:

| | |
|---|---|
| n(sec$^{-1}$) | pump speed of rotation |
| $t_K$(sec) | piston stroke time |
| d(m) | pipe diameter |
| $\nu$(m$^2$sec$^{-1}$) | kinematic viscosity |
| $\dot{V}$(m$^3$sec$^{-1}$) | volumetric flow rate (stream of liquid) |

The calculated example which is given below shows that the adjusted intermittent pipe flow according to the invention in practice provides for more suitable pipe dimensions than a continuous turbulent flow. A rectangular flow achieved in this way cannot possibly be disturbed in the ripening path by the flow in the previous mixing path because the two flows are only joined together by a tube whose cross-sectional area is small in proportion to the cross-section of the ripening pipe.

According to another particularly suitable embodiment, the storage pipes are constructed so that they can be transported on wheels and tipped and can be replaced by larger or smaller pipes or pipes which are differently connected. A production plant can in this way be adapted to all the requirements of any production recipe. The storage apparatus, which are composed of individual elements, can quickly be replaced by others by means of snap connections and due to their possibility of being tilted they can easily be cleaned.

It has surprisingly been found that the apparatus can also be adapted to recipes for emulsions which should not have particles of uniform size but are required to have a certain spectrum of particle sizes. According to the invention, this is achieved by subdividing the stream of liquid by means of the ripening pipe packet into individual partial streams which have differing, exactly defined ripening times. This subdivision is achieved by providing bypass ducts with adjustable restrictors which can be individually switched on and off by means of multiway taps.

An embodiment of the invention is described below in more detail with reference to the attached drawings in which:

FIG. 1 represents by way of example a process for the preparation of an emulsion, using three inlets (A, B and C), in which the various stages of the process proceed one after another as follows (the term "inlet" has been taken over from the usual batchwise process carried out in a reaction vessel):

Figure 1:
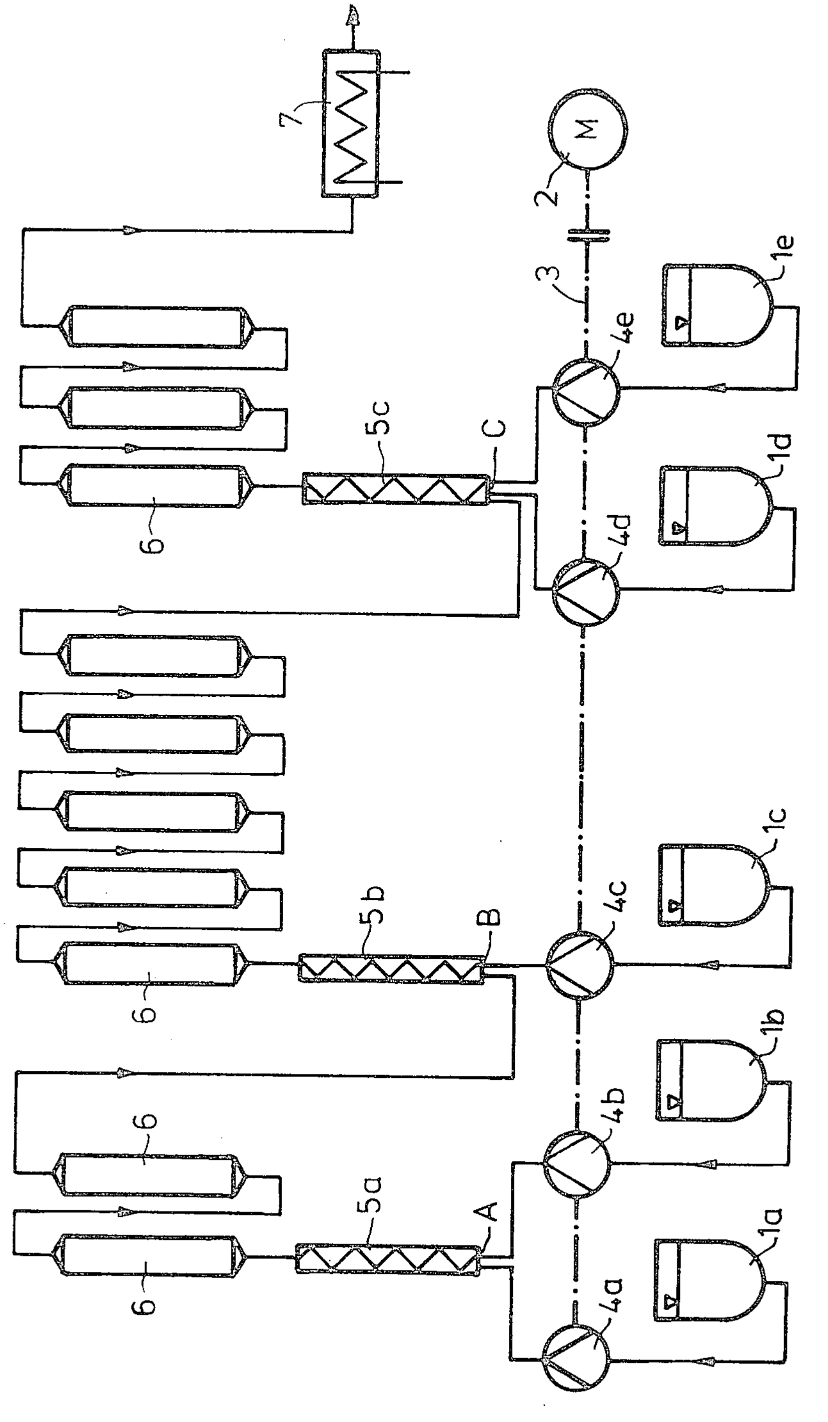
FIG. 1 is a schematic representation of the process and apparatus.

| Stage | Position | Individual operation |
|---|---|---|
| I | Inlet point A at beginning of pipe | Introduction of halide solution with gelatin. Introduction of silver nitrate solution. |
| II | Mixing path A | Mixing of the two streams. |
| III | Ripening path A | Ripening process. |
| IV | Inlet point B | Introduction of silver nitrate solution. |
| V | Mixing path B | Mixing of the two streams. |
| VI | Ripening path B | Ripening process. |
| VII | Inlet point C | Introduction of halide solution. Introduction of silver nitrate solution. |
| VIII | Mixing path C | Mixing of the three streams. |
| IX | Ripening path C | Ripening process. |
| X | End of pipe | Outflow through a cooling path. |

The apparatus for carrying out this process is composed of the following individual parts:

- Storage vessels 1a to 1e for halide solution and silver nitrate solution,
- A multiple metering pump consisting of a transmission motor 2, crankshaft 3 and pump heads 4a to 4e,
- Three mixing paths 5a to 5c,
- Three storage pipe units composed of differing numbers of storage pipes 6,
- A cooling path 7 attached to the outlet of the apparatus.

The halide solution and silver nitrate solution from the inlet vessels 1a and 1b are delivered to the mixing path 5a into which they are introduced at the inlet A at the beginning of the process by the metering pump heads 4a and 4b. The resulting mixture is delivered to the first ripening path composed of two pipes 6 connected in series. The time of flow through this path corresponds to the ripening time dictated by the recipe. In the following mixing path 5b, the solution from the storage vessel 1c is introduced at the inlet B by way of the pump head 4c. The now enlarged stream flows through the second ripening path consisting of five pipes 6 connected in series and is then conveyed to the mixing path 5c where the solutions from storage vessels 1d and 1e are added at a third inlet C by way of the pump heads 4d and 4e. The now even larger stream flows through the third ripening path composed of three pipes 6 and leaves the apparatus through the cooling path 7.

Figure 2:
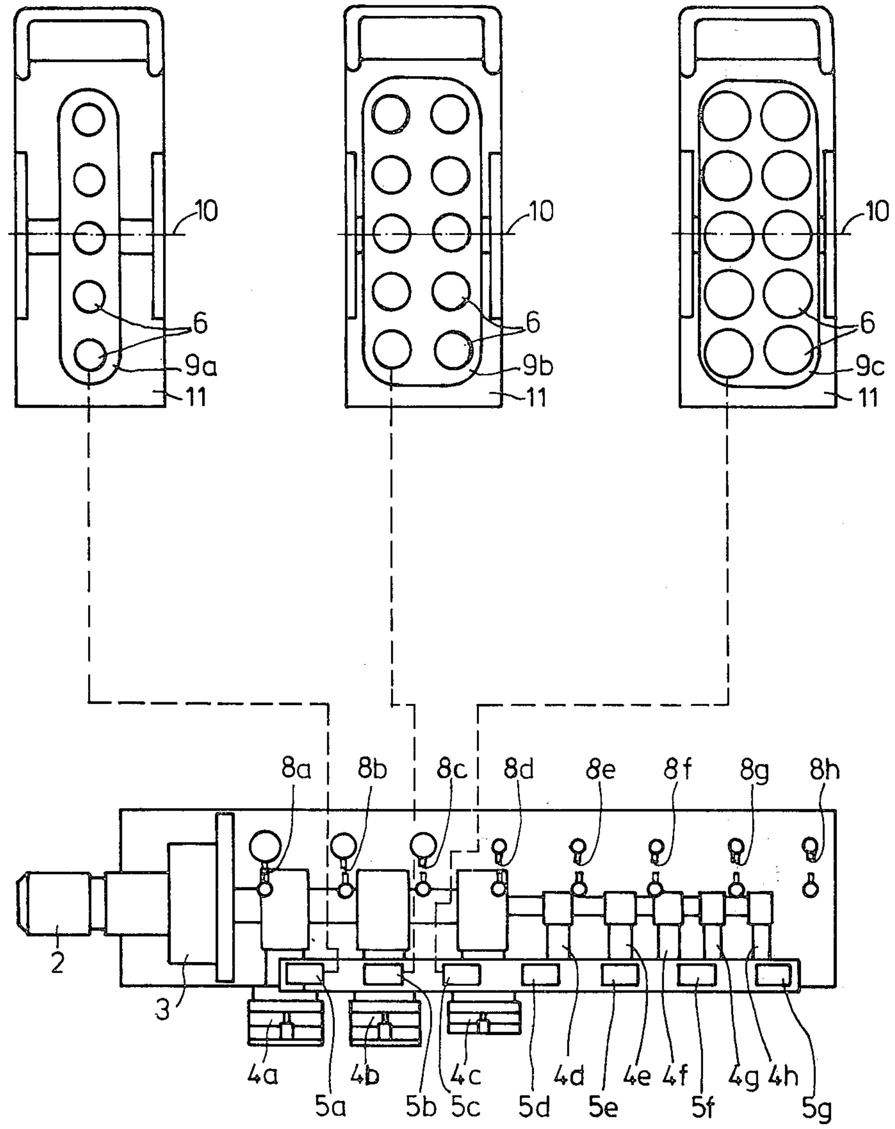
FIG. 2 is a plan view of the apparatus.
Figure 3:
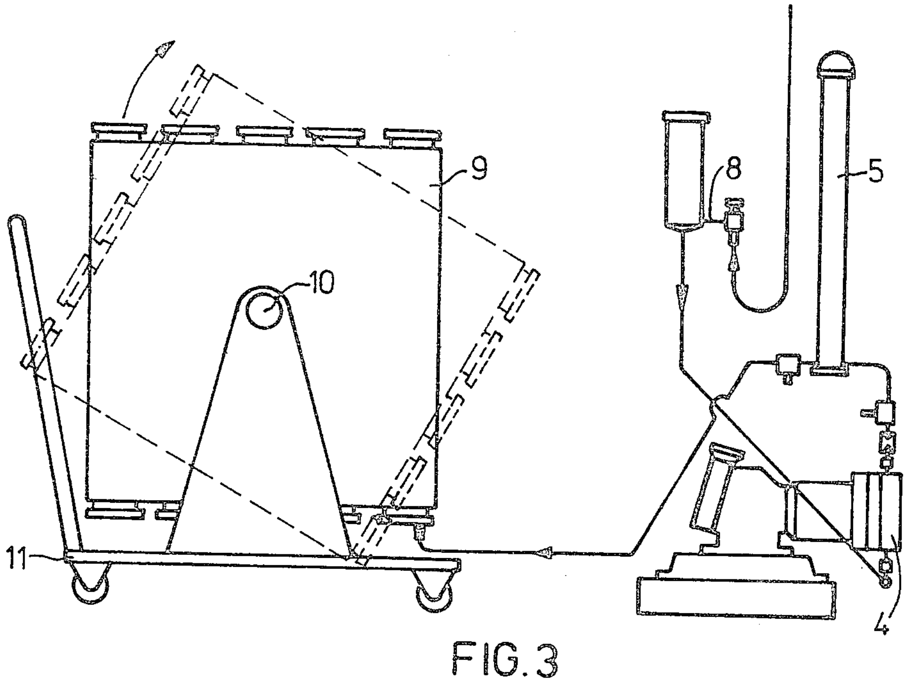
FIG. 3 is an elevational view of the apparatus.

FIGS. 2 and 3 show the arrangement of the main parts of the apparatus. The storage vessels 1*a* to 1*e* and the cooling path 7 are not shown, nor are any pipe connections shown in this plan view (except for schematic broken line representations between mixing paths 5*a*, 5*b*, 5*c* and respective ripening path pipes 6). The piston metering pump in this example comprises eight pump heads differing in size, the heads 4*a* to 4*e* shown connected in FIG. 1 and reserve heads 4*f* to 4*h*. The heads are generally not connected in the order in which they are arranged but according to the output of the different streams of liquid required by the recipe. This output is then adjusted by adjusting the piston stroke. All the pistons move in unison, i.e. no delivery occurs in any part of the system during the return stroke. Identical mixing paths 5*a* to 5*g* are arranged on the pump frame. Of these, only the paths 5*a* to 5*c* are in operation in the circuit according to FIG. 1. The individual mixing paths equipped with static mixers are U-shaped so that both the inlet and outlet are at the bottom. Each mixing path has three input connections and one discharge connection. In the flow diagram of FIG. 1, only two input connections are used in the mixing paths 5*a* and 5*b*. Eight flow meters 8*a* to 8*h* (shown in FIG. 2) corresponding to the number of pump heads are provided in the flow circuit of FIG. 1 to control the metering between the storage vessel and the pump head. The ripening paths consist of packets 9*a*, 9*b* and 9*c* having five or ten individual pipes 6. In the flow circuit of FIG. 1, however, only two, five and three pipes, respectively, are in operation. These pipes are connected together by flexible tubes. Each packet is mounted on a carriage 11 and is pivotal about an axis 10. It is therefore easy to clean and one type of packet can easily be replaced by another with a different number of pipes or with pipes of different dimensions as required for a different recipe. Since metering pump heads with different outputs are also available, the apparatus can be adapted to virtually any flow rates required by a recipe by suitable tube connections.

The volumes of the connecting tubes and mixing paths are small compared with the volume of the ripening paths and therefore have virtually no influence on the throughflow time.

When deciding on the cross-section of the connecting tubes in which the liquid flows downwards, it must be remembered that the flow velocity must be greater than the velocity at which any air bubbles ascend.

The whole plant can be operated in daylight without damaging the light-sensitive emulsion.

The volume of the individual ripening paths is dictated by the flow rate and the ripening time, both of which depend on the recipe. The diameter of the pipe should be chosen within the limits determined by the flow rate. The lower limit, as indicated above, depends upon the pump speed of rotation and the kinematic viscosity. The upper limit is determined by the fact that a minimum velocity must be maintained in order to aprevent sedimentation.

When the diameter and total length of the ripening path have been determined, it can be built up in various ways from the pipe packets provided.

Figure 4:
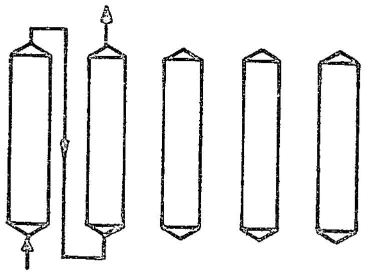
FIGS. 4–7 show various possible arrangements for connecting the packets of ripening pipes.

Various possibilities are illustrated in FIGS. 4 to 7. FIG. 4 represents the partial utilisation of a pipe packet.

Figure 5:
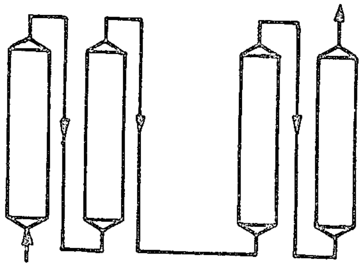
Figure 6:
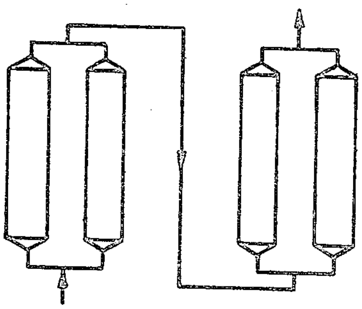
Figure 7:
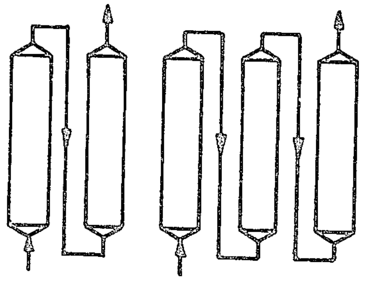

The arrangement corresponds to the ripening packet 9*a* of FIG. 2. In this case, the flow passes through only two of the five ripening pipes, in accordance with the corresponding flow diagram of FIG. 1. FIG. 5 shows two ripening packets connected in series, each having two pipes connected in series, and FIG. 6 shows two ripening packets connected in series, each having two pipes connected in parallel. FIG. 7 represents a packet of five pipes used to form two ripening paths, the first of which is composed of two pipes and the other of three pipes.

Figure 8:
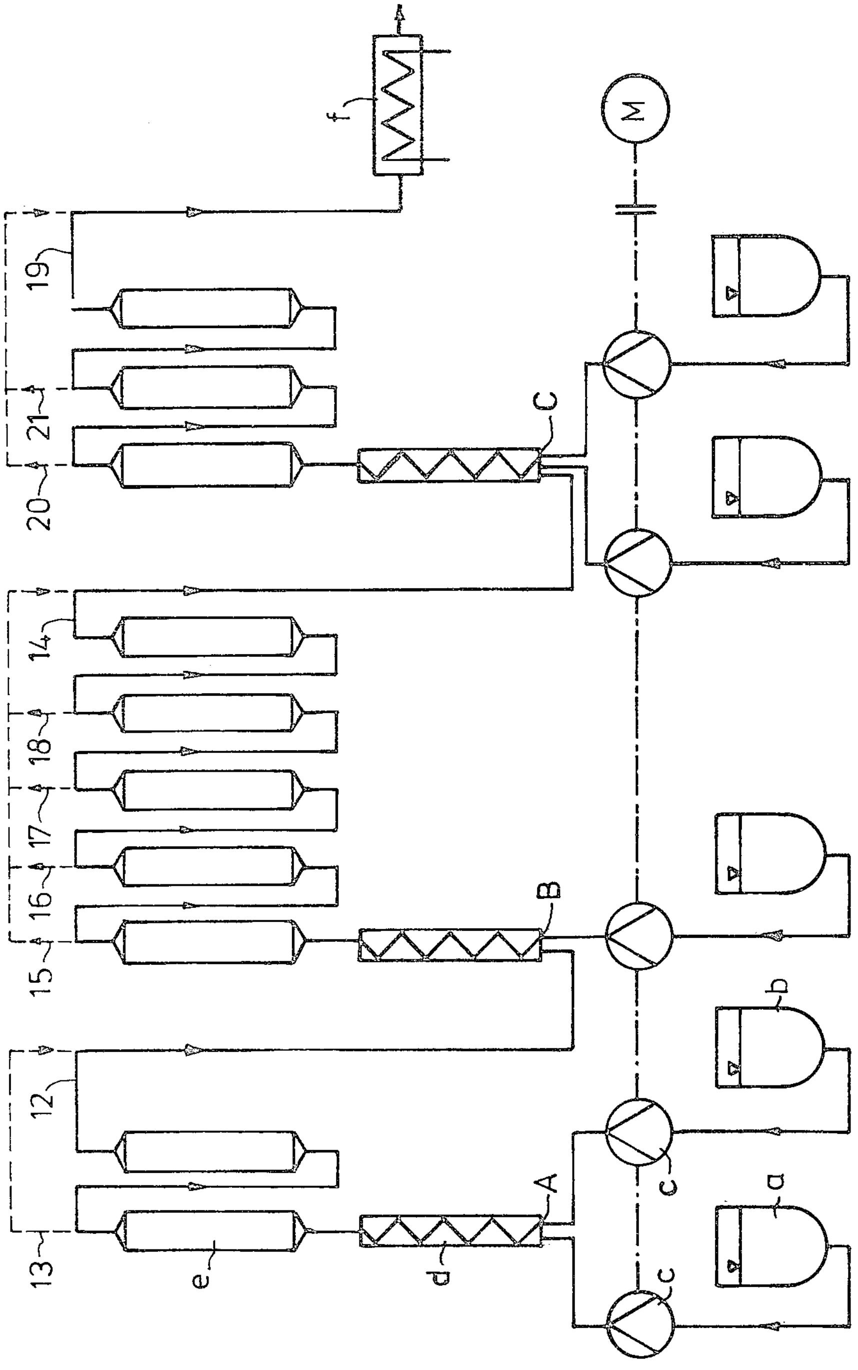
FIG. 8 represents an apparatus according to FIG. 1 enlarged by connection of additional parts.

FIG. 8 illustrates the application of the process for obtaining a wide spectrum of through-flow times for specific partial streams to the example illustrated in FIGS. 1 to 3. The flow diagram of FIG. 1 is in this case modified by the addition of bypass pipes indicated in broken lines. Restrictors (not shown) are arranged in the bypass pipes to adjust the flow rates.

Figure 9:
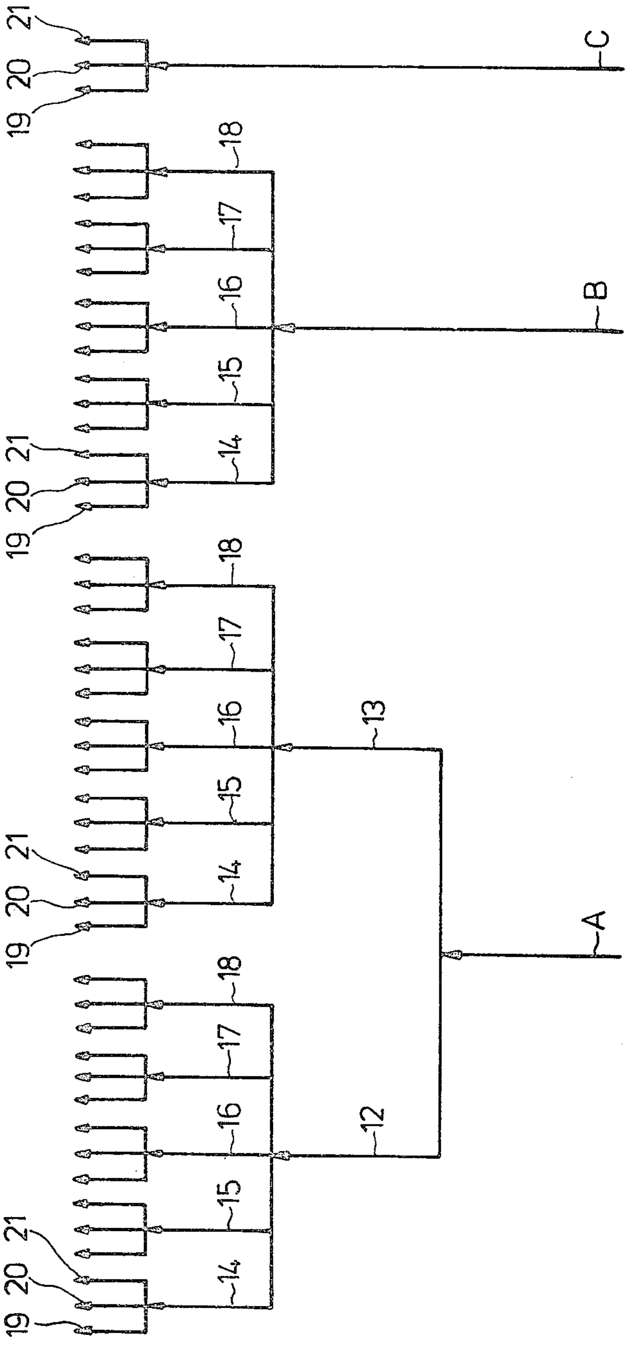
FIG. 9 is an overall view showing the different possible arrangements for connecting the parts of the apparatus of FIG. 8.

FIG. 9 gives an overall view of the various paths of flow which can be achieved with this arrangement. The numbering corresponds to the numbering of the flow paths 12 to 21 in FIG. 8. Each path has its own particular flow time. In this way, it is possible to adapt the system to 48 different through-flow times.

Figure 10:
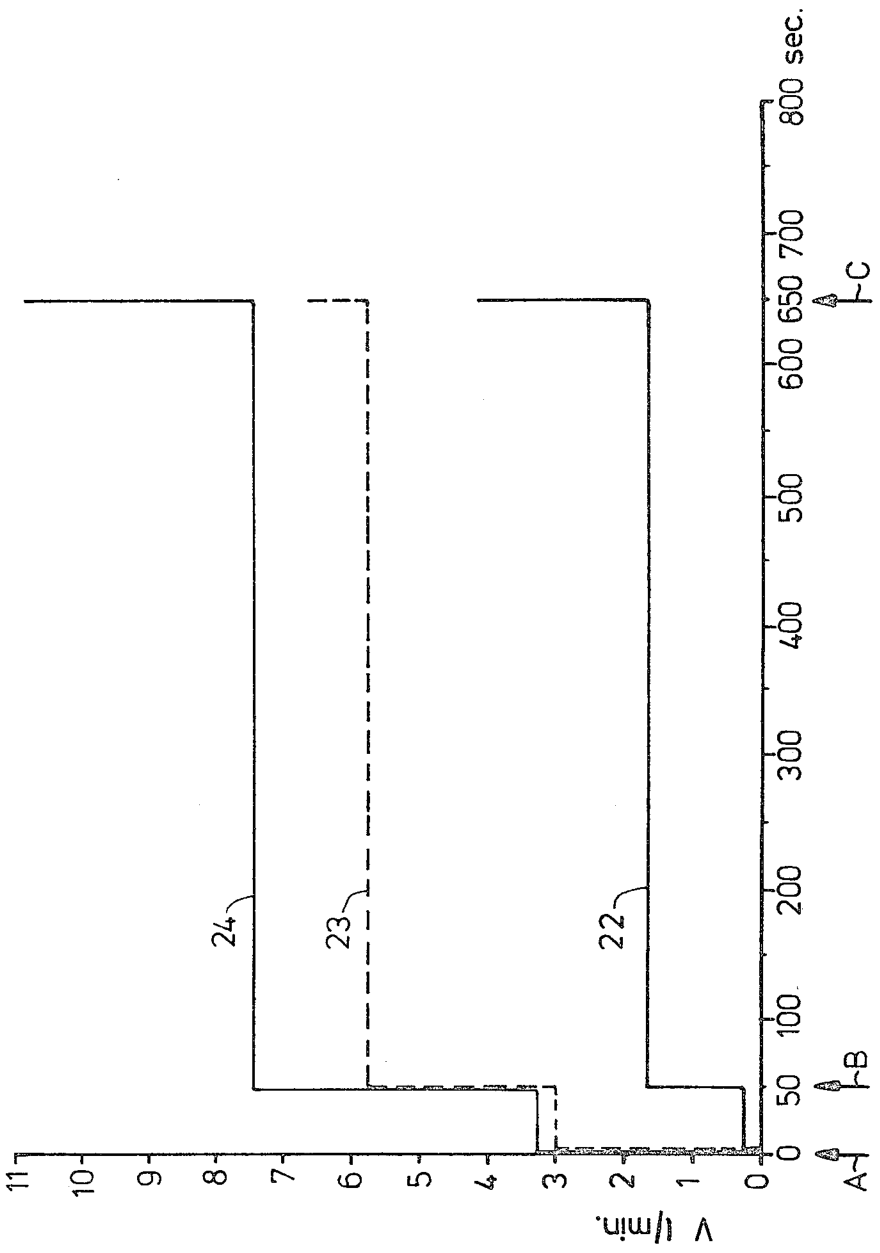
FIG. 10 is a graphic representation of an example of a simple recipe for the preparation of an emulsion.

FIG. 10 represents a simple example of a recipe. In this graphic representation of a recipe formulation three inlets A, B and C, the individual flow rates are plotted against time. The silver nitrate stream is represented by 22, the halide stream by 23 and the total stream by 24. The chemical reaction between the halide and silver nitrate has not been taken into account since it has no effect on the rates of flow. The preparation of the recipe comprises the following stages:

| Stage | Position | Individual operation |
|---|---|---|
| I | Inlet point A at beginning of pipe | Introduction of 3.0 l/min halide solution. Introduction of 0.28 l/min silver nitrate solution. |
| II | Mixing path A | Mixing of the 2 streams. |
| III | Ripening path A | Ripening process: time 50 sec. |
| IV | Inlet point B | Introduction of 2.79 l/min halide solution. Introduction of 1.40 l/min silver nitrate solution. |
| V | Mixing path B | Mixing of streams. |
| VI | Ripening path B | Ripening process: time 600 sec. |
| VII | Inlet point C | Introduction of 0.84 l/min halide solution. Introduction of 2.52 l/min silver nitrate solution. |
| VIII | Mixing path C | Mixing of streams. |
| IX | End of pipe | Outflow through cooling path. |

Figure 11:
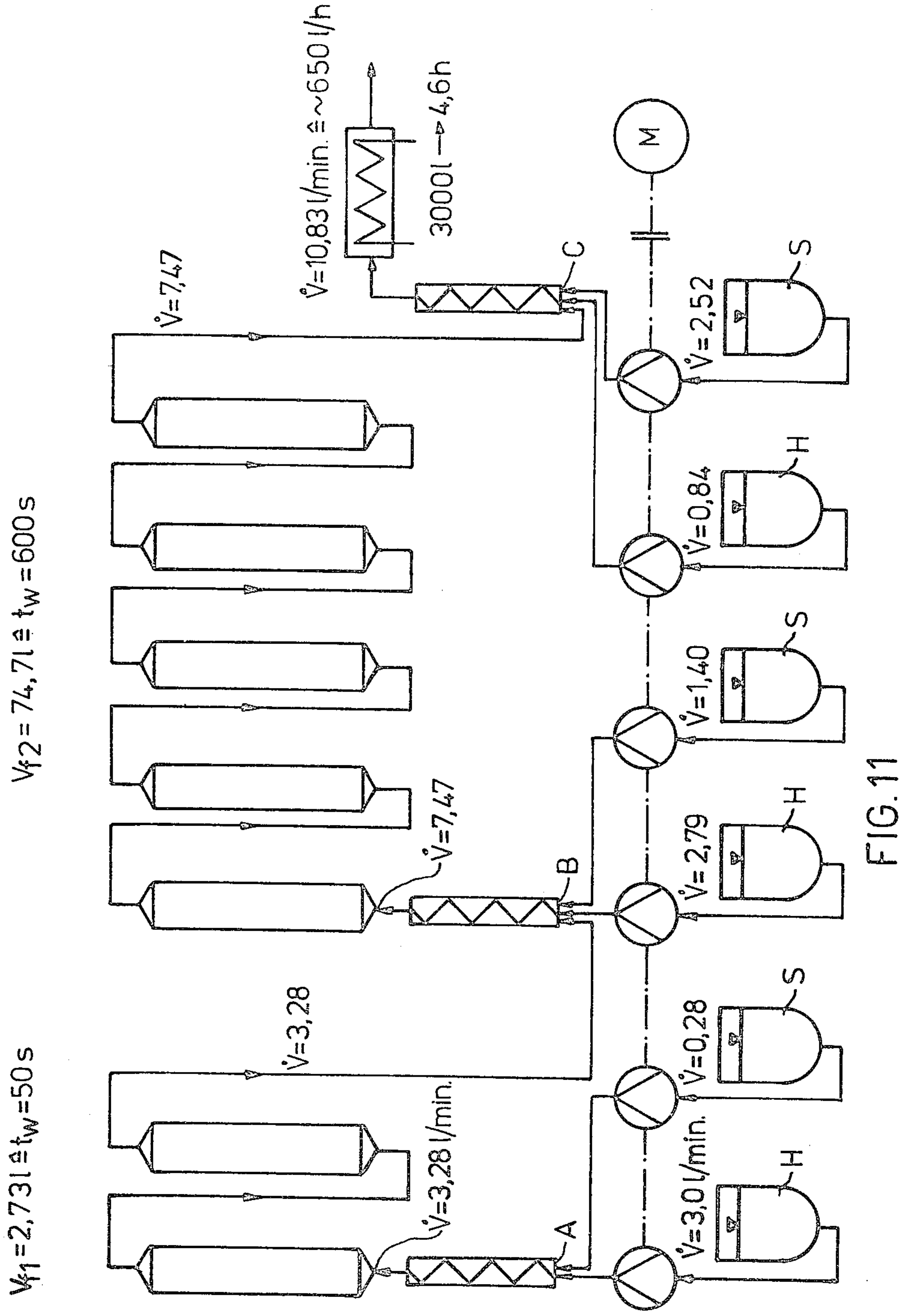
FIG. 11 represents schematically the apparatus for the preparation of an emulsion represented in FIG. 10.

This process is represented by the flow diagram of FIG. 11. This differs from the flow diagram of FIG. 1 in that two solutions are now added at the inlet B and there is no ripening path after the last mixing path. The flow rates, dwell times and volumes of storage pipes dictated by the recipe entered in the flow diagram of FIG. 11. The output of the path is 10.83 l/min or approximately 3000 liters in 4.6 hours. The condition for obtaining a rectangular velocity profile is calculated below by way of example for the second set of storage pipes. According to FIG. 11, the following equation is obtained:

$$\dot{V}=7.47 \text{ l/min}=0.125\times 10^{-3} \text{ m}^3\text{/sec}$$

Assuming a length of 1.8 meters for each of the five ripening pipes and given the volume of the storage pipes as $V_{f2}=74.7$ l, the pipe diameter is found to be $$d=0.10 \text{ m.}$$

Given that the kinematic viscosity is $$\nu=2\times 10^{-6} \text{ m}^2/\text{sec}$$

and using this in the formulae given above, it is found that $$Re=\frac{8}{\pi}\;\frac{\dot{V}}{d}=\frac{8}{\pi}\;\frac{0.125\times 10^{-3}}{0.10\times 2\times 10^{-6}}=1590<2320$$

and the pump speed is found to be $$n>\frac{10^3}{2\times 1.15}\times\frac{\nu}{d^2}=\frac{10^3}{2\times 1.15}\times\frac{2\times 10^{-6}}{0.12}$$

$n \geqq 0.1$/sec.

At a given pump speed of $n=1$/sec, the condition for a rectangular pipe flow is certainly fulfilled. It is also necessary to ensure that the flow velocity inside the ripening pipes is sufficiently high compared with the sedimentation velocity of the silver grains.

When $$\dot{V}=0.125\times 10^{-3} \text{ m}^3\times\text{sec}^{-1}$$

and $$d=0.10 \text{ m}$$

it is found that $$v=0.016 \text{ m}\times\text{sec}^{-1}$$

is a sufficient delivery velocity.

Figure 12:
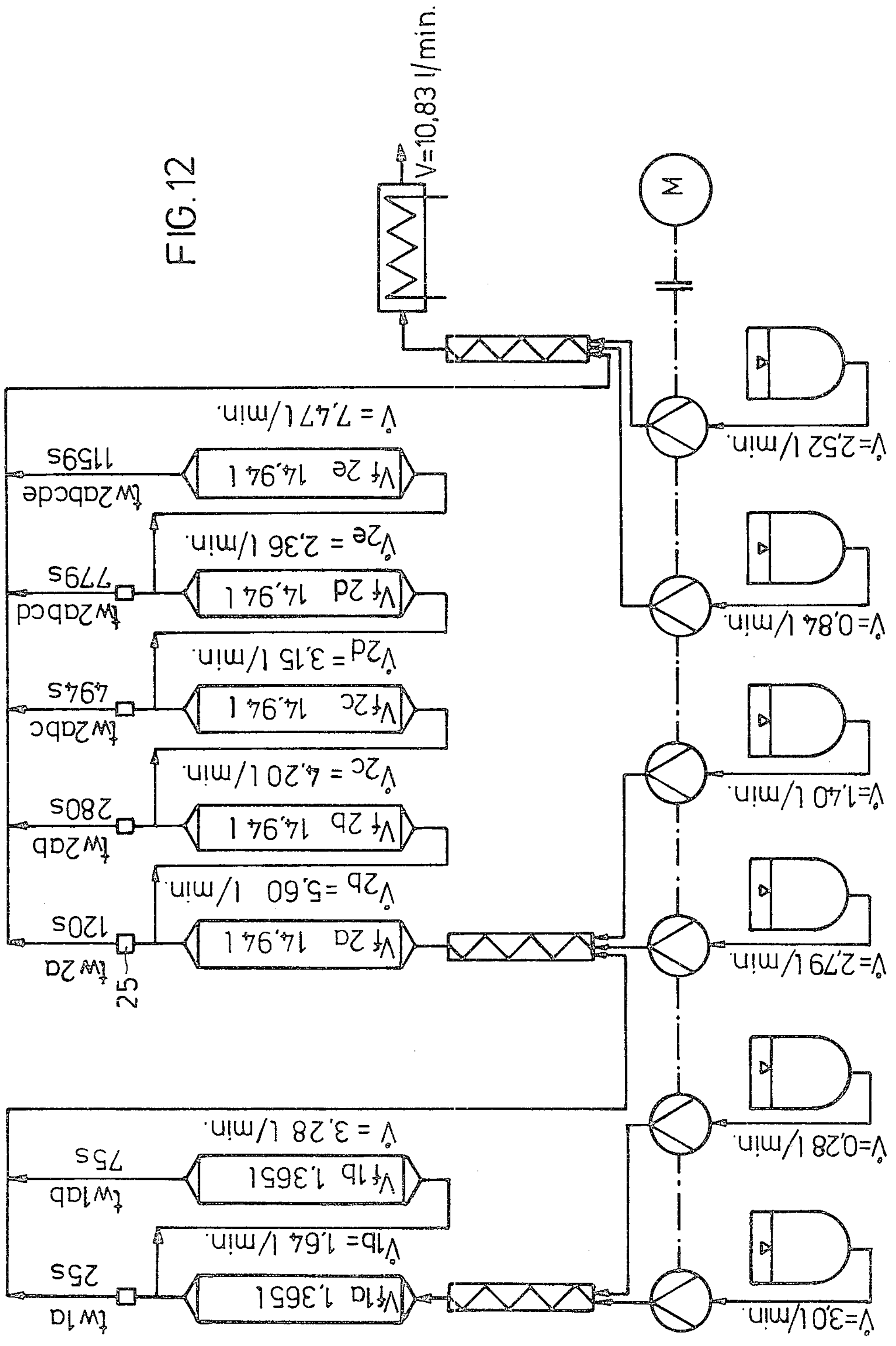
FIG. 12 is a schematic representation of the enlarged apparatus of FIG. 11.

The flow diagram of FIG. 11 has been extended in FIG. 12, where bypass ducts with restrictors 25 are connected into the ripening paths. The flow rates of the streams entering the apparatus and the volumes of the storage pipes. $V_{f1a}$, $V_{f1b}$, $V_{f2a}$ to $V_{f2e}$ correspond to those of FIG. 11. The through-flow times based on the various paths of the individual partial streams through the first and second storage pipe systems are indicated by the references $t_{W1a}$, $t_{W1b}$ to $t_{W2a}$ to $t_{W2abcde}$. Ten different total flow times are obtained. The smallest is 25+120=145 sec and the greatest is 75+1159=1234 sec. Multiway taps may be provided at the junctions for easy variation of the flow paths.

What is claimed is:

1. A process for the continuous preparation of photographic emulsion consisting of halide solution, gelatin and silver salt in which a stream flows through a pipe system having successively arranged a pumping volume, a mixing section volume, and a ripening section volume and connecting conduit volumes, said mixing section volume and connecting conduit volumes being relatively smaller than the ripening section volume, comprising the steps of piston metering the emulsions consisting of halide, silver salt and gelatin through the pumping section volume in unison, and selecting the flow characteristics of the ripening section volume relative to the operating characteristics of the piston metering pumps and the kinematic viscosity of the streams of emulsion so that the delivery of the stream in the ripening sections always occurs in coordination with the starting flow in the metering pumps, and has a rectangular velocity profile, and the flow from the mixing section volume to the ripening section volume is slight relative to the flow in the ripening section volume whereby the flow in the ripening section is isolated from the mixing section, and the influence on flow in the ripening section volume from the mixing section volume and connecting conduits volumes is minimized.

2. A process as set forth in claim 1, wherein the rectangular velocity profile is attained for the laminar flow at a Reynolds number Re<2320 by the formula $$t_K=\frac{1}{2n}<1.15\times 10^{-3}\frac{d^2}{\nu}$$

wherein is

| | |
|---|---|
| $N$ (sec$^{-1}$) | the pump speed of rotation |
| $t_K$ (sec) | the piston stroke time |
| $d$ ($m$) | the pipe diameter |
| $\nu$ ($m^2$sec$^{-1}$) | the kinematic viscosity |
| $\dot{V}$ ($m^3$sec$^{-1}$) | the volumetric flow rate (stream of liquid |
| $Re=\frac{8}{\pi}\cdot\frac{\dot{V}}{D\nu}$ | the Reynolds number |

3. A process as set forth in claim 1, wherein the rectangular velocity profile is attained for the turbulent flow at a Reynolds number Re>2320 by the formula $$t_K=\frac{1}{2n}<\frac{\pi}{8}\;\frac{d^3}{\dot{V}}$$

wherein is

| | |
|---|---|
| $N$ (sec$^{-1}$) | the pump speed of rotation |
| $t_K$ (sec) | the piston stroke time |
| $D$ ($m$) | the pipe diameter |
| $\nu$ ($m^2$sec$^{-1}$) | the kinematic viscosity |
| $\dot{V}$ ($m^3$sec$^{-1}$) | the volumetric flow rate (stream of liwuid |
| $Re=\frac{8}{\pi}\cdot\frac{\dot{V}}{d\nu}$ | the Reynolds number |

* * * * *